(12) United States Patent
Gunther et al.

(10) Patent No.: US 12,479,884 B2
(45) Date of Patent: Nov. 25, 2025

(54) INTRAGEL WELL SAMPLE LOADING SYSTEM

(71) Applicant: YALE UNIVERSITY, New Haven, CT (US)

(72) Inventors: Erik Gunther, Branford, CT (US); Mikhail Kostylev, New Haven, CT (US); Stephen Strittmatter, Durham, CT (US)

(73) Assignee: Yale University, New Haven, CT (US)

( * ) Notice: Subject to any disclaimer, the term of this patent is extended or adjusted under 35 U.S.C. 154(b) by 691 days.

(21) Appl. No.: 17/634,657

(22) PCT Filed: Aug. 12, 2020

(86) PCT No.: PCT/US2020/045914
§ 371 (c)(1),
(2) Date: Feb. 11, 2022

(87) PCT Pub. No.: WO2021/030427
PCT Pub. Date: Feb. 18, 2021

(65) Prior Publication Data
US 2022/0281913 A1    Sep. 8, 2022

Related U.S. Application Data

(60) Provisional application No. 62/885,585, filed on Aug. 12, 2019.

(51) Int. Cl.
*C07K 1/26*    (2006.01)
*B01D 57/02*    (2006.01)

(52) U.S. Cl.
CPC ............... *C07K 1/26* (2013.01); *B01D 57/02* (2013.01)

(58) Field of Classification Search
CPC ................................. C07K 1/26; B01D 57/02
See application file for complete search history.

(56) References Cited

U.S. PATENT DOCUMENTS 4,654,132 A * 3/1987 Takagi ................... C12P 21/02
204/468
4,930,893 A    6/1990 Manian
(Continued)

FOREIGN PATENT DOCUMENTS

CN    207439996 U * 6/2018
JP    2001133438 A * 5/2001
(Continued)

OTHER PUBLICATIONS

Kitamori et al., JP2001133438A, English translation, 2001 (Year: 2001).*

(Continued)

*Primary Examiner* — Luan V Van
*Assistant Examiner* — Shizhi Qian
(74) *Attorney, Agent, or Firm* — Saul Ewing, LLP; Kathryn Doyle; Justin Crotty

(57) ABSTRACT

The present invention provides a protein separation microgel having a first plate having a first opening; a second plate; a gel substrate formed between the first plate and the second plate; and a plurality of wells positioned at a first non-zero distance from a first edge of the gel and at a second non-zero distance from a second edge of the gel; wherein the first and second edge of the gel are opposite edges of the gel.

16 Claims, 6 Drawing Sheets

(56) References Cited

U.S. PATENT DOCUMENTS

| | | | |
|---|---|---|---|
| 5,071,371 A | 12/1991 | Harwath et al. | |
| 2002/0079222 A1* | 6/2002 | Sevigny | G01N 27/44747 204/620 |
| 2004/0020776 A1* | 2/2004 | Ben-Asouli | G01N 27/44743 204/615 |
| 2004/0129567 A1 | 7/2004 | Auton et al. | |
| 2005/0016850 A1 | 1/2005 | Tabuchi et al. | |
| 2011/0042217 A1* | 2/2011 | Updyke | G01N 27/44778 204/620 |
| 2014/0034500 A1* | 2/2014 | Updyke | G01N 27/44747 204/462 |
| 2014/0138249 A1* | 5/2014 | Wang | G01N 27/453 204/620 |
| 2014/0231260 A1 | 8/2014 | Updyke et al. | |
| 2014/0339091 A1* | 11/2014 | Henry | G01N 27/44756 204/606 |

FOREIGN PATENT DOCUMENTS

| | | | | |
|---|---|---|---|---|
| WO | 2000002039 A1 | 1/2000 | | |
| WO | WO-2014088948 A1 * | 6/2014 | | G01N 27/44704 |

OTHER PUBLICATIONS

International Search Report and Written Opinion dated as mailed Feb. 26, 2021 in International Patent Application No. PCT/US2020/045914.

Georgia Tech, "SDS Page Gel Electrophoresis", May 1, 2001, https://williams.chemistry.gatech.edu/course_Information/4581/techniques/gel_elect/page_protein.html, 5 pages.

* cited by examiner

INTRAGEL WELL SAMPLE LOADING SYSTEM

CROSS-REFERENCE TO RELATED APPLICATIONS

The present application is a 35 U.S.C. § 371 national phase application from, and claims priority to, International Application No. PCT/US2020/045914 filed Aug. 12, 2020, which, claims the benefit of priority under 35 U.S.C. § 119 (e) to U.S. Provisional Patent Application No. 62/885,585, filed Aug. 12, 2019, the contents of which are incorporated by reference herein in their entireties.

STATEMENT REGARDING FEDERALLY SPONSORED RESEARCH OR DEVELOPMENT

This invention was made with government support under NS097283, AG034924, and AG053000 awarded by the National Institutes of Health. The government has certain rights in the invention.

BACKGROUND OF THE INVENTION

Gel electrophoresis is universally performed by administering sample to the border of a gel in contact with buffer solution, typically a well that is cast at the top edges of a planar gel slab. Samples are thus immersed in buffer solution, which can present mixing errors and errors of pipetting precision. In addition, hand-held pipettors are inaccurate at low volumes and small volumes behave uncontrollably when they come into contact with buffer solution as is typically the case with the standard top-loading gel formats.

SUMMARY OF THE INVENTION

In various embodiments, the present invention provides a protein separation microgel having a first plate having a first opening; a second plate; a gel substrate formed between the first plate and the second plate; and a plurality of wells positioned at a first non-zero distance from a first edge of the gel and at a second non-zero distance from a second edge of the gel; wherein the first and second edge of the gel are opposite edges of the gel.

In some embodiments, the plurality of wells are positioned collinearly.

In some embodiments, the gel substrate comprises polyacrylamide. In some embodiments, the polyacrylamide gel comprises between about 3% acrylamide and about 20% acrylamide by weight. In some embodiments, the polyacrylamide gel comprises 5% acrylamide, 10% acrylamide, 12.5% acrylamide, 15% acrylamide, or 20% acrylamide by weight. In some embodiments, the gel substrate is a gradient gel. In some embodiments, the gradient comprises 3% to 8%, 4% to 15%, 4% to 20%, or 8% to 25% acrylamide by weight.

In some embodiments, the second plate comprises a second opening, wherein the opening of the second plate is aligned with the opening of the first plate.

In some embodiments, the plurality of collinear wells are formed by a well-forming insert comprising a plurality of teeth extending through the gel substrate within the first opening. In some embodiments, the plurality of teeth extend through the gel at an orthogonal angle to the plane of the gel substrate.

In some embodiments, the wells have a volume of about 0.05 µL to about 20 µL. In some embodiments, the microgel has a width of between about 1.5 cm and about 3.5 cm. In various embodiments, the microgel has a height of between about 1.0 cm and about 3.0 cm. In various embodiments, the microgel has a thickness of between about 0.1 mm and about 5 mm. In some embodiments, the first and second distance are at least about 0.1 mm. In some embodiments, the first distance is between about 0.1 mm and about 2 mm. In some embodiments, the first distance to second distance ratio is less than about 1:3.

In various aspects, the present invention provides a method for separating proteins comprising: obtaining a microgel as described herein; loading the wells with a volume of one or more samples, the samples comprising a plurality of proteins; applying an electric field to the loaded gel; and running the electric field until a running front of the one or more samples reaches a preferred distance from the wells; thereby separating the plurality of proteins.

In various aspects, the present invention provides an electrophoresis device comprising: one or more microgel-holding cassettes comprising one or more positive electrodes and one or more negative electrodes, a box comprising one or more sets of slots for positioning the plurality of cassettes, a volume of a running buffer, and a power supply configured to engage with the one or more positive electrodes and one or more negative electrodes, wherein when the power supply is in an operating mode and is engaged with the electrodes, an electric field is applied to the loaded gel.

In various aspects, the present invention provides a protein separation system comprising: a gel region adapted and configured to receive a gel having a depth less than its length; a pair of parallel electrodes positioned on opposing sides of the length of the gel received in the gel region; a pair of orthogonal electrodes positioned on opposing sides of the depth of the gel received in the gel region; and a sample reservoir adapted and configured for positioning proximal to the gel received in the gel region such a first electric field flows from a negative orthogonal electrode, through the sample reservoir, and through the gel received in the gel region to the positive orthogonal electrode.

In some embodiments the protein separation system further comprises: a controller adapted and configured to: apply the first electric field across the pair of orthogonal electrodes to load a sample in the sample reservoir onto the gel received in the gel region; then apply a second electric field across the pair of parallel electrodes to separate proteins within the gel received in the gel region.

In some embodiments, the protein separation system further comprises a first switch configured to apply the first electric field across the pair of orthogonal electrodes to load a sample in the sample reservoir onto the gel received in the gel region; then a second switch configured to apply a second electric field across the pair of parallel electrodes to separate proteins within the gel received in the gel region.

In some embodiments, the protein separation system is configured to apply the first electric field and the second electric field serially.

In some embodiments, the pair of orthogonal electrodes are positioned proximal to a negative parallel electrode.

In some embodiments, the sample reservoir is an electrically insulative vessel.

BRIEF DESCRIPTION OF THE DRAWINGS

For a fuller understanding of the nature and desired objects of the present invention, reference is made to the following detailed description taken in conjunction with the accompanying drawing figures wherein like reference characters denote corresponding parts throughout the several views.

DEFINITIONS

Figure 1:
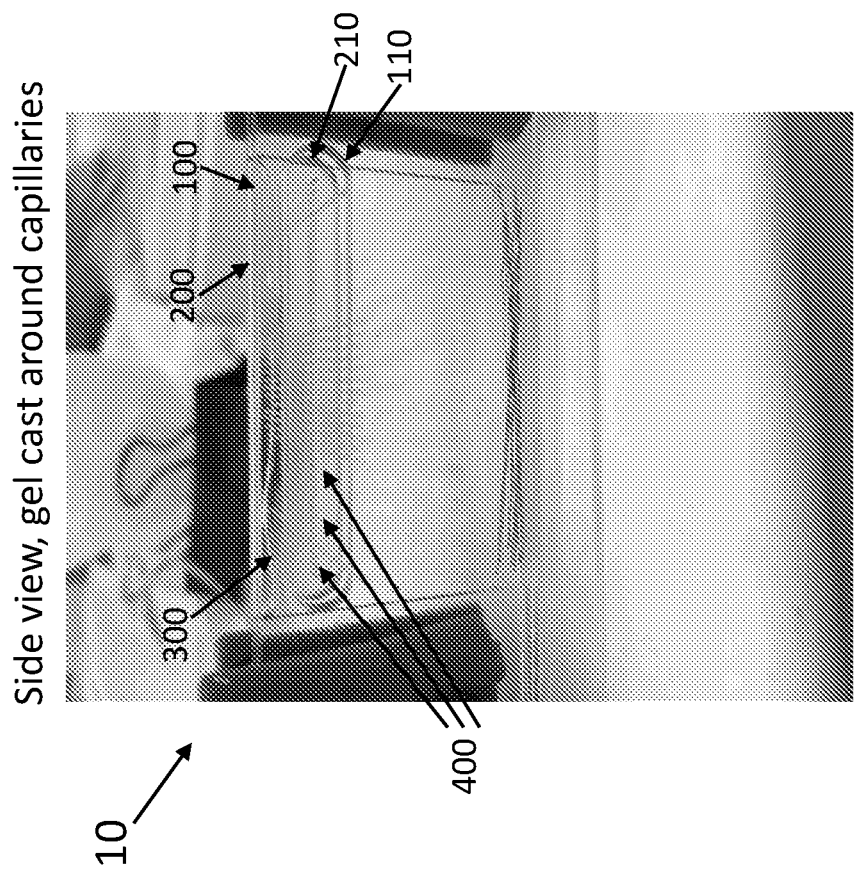
FIG. 1 depicts a front view of an exemplary intragel well sample loading system accordingly to an embodiment of the present invention. The loading system as shown has a first plate in the front with openings that include one side of the wells, a second plate in the back, that has openings that include the opposing sides of the wells, and a gel between the two plates. The two plates are secured by brackets, as shown, holding the two plates together along the side edges.

The instant invention is most clearly understood with reference to the following definitions.

As used herein, the singular form "a," "an," and "the" include plural references unless the context clearly dictates otherwise.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from context, all numerical values provided herein are modified by the term about.

As used in the specification and claims, the terms "comprises," "comprising," "containing," "having," and the like can have the meaning ascribed to them in U.S. patent law and can mean "includes," "including," and the like.

The term "intragel well" as used herein is understood as a well or plurality of wells formed within the running gel or stacking gel of a separation gel rather than within a well formed at the boundary of a stacking gel or pregel portion of a sample separating gel in contact with a running buffer reservoir.

Unless specifically stated or obvious from context, the term "or," as used herein, is understood to be inclusive.

Ranges provided herein are understood to be shorthand for all of the values within the range. For example, a range of 1 to 50 is understood to include any number, combination of numbers, or sub-range from the group consisting 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 (as well as fractions thereof unless the context clearly dictates otherwise).

DETAILED DESCRIPTION OF THE INVENTION

The present invention provides separation microgel compositions and one or more methods of separating proteins or other biological compositions in a sample using one or more microgels as described herein.

Separation Microgel

Embodiments of the present invention provide one or more protein separation microgel assemblies. The separation microgel assembly 10 includes a first plate 100, a second plate 200, and a gel substrate 300 having a plurality of wells 400. The gel can be formed between the first plate 100 and second plate 200.

Referring now to FIG. 1, the first plate 100 in various embodiments has four or more edges including a top edge, a bottom edge, and two side edges. First plate 100 can have one or more openings 110 positioned a distance from the top edge of plate 100. For example, the opening 110 can be a distance from the top edge including up to about 0.5 mm, about 0.5 mm to about 1 mm, about 1 mm to about 2 mm, about 2 mm to about 3 mm, about 3 mm to about 4 mm, about 4 mm to about 5 mm, about 5 mm to about 6 mm, about 6 mm to about 7 mm, about 7 mm to about 8 mm, about 8 mm to about 9 mm, about 9 mm to about 10 mm, including distances therebetween. Opening 110 is positioned equidistant from each of the side edges of first plate 100 and extends a width that is less than the width of plate 100. Opening 110 is sized large enough to accommodate one or more well-forming apparatus including, for example, one or more well-forming combs having a plurality of teeth, one or more rods and/or tubes including, for example, capillary tubes spaced within the opening, and the like.

First plate 100 has a width of about 1 cm and about 6 cm including up to about 1 cm, about 1 cm to about 1.5 cm, about 1.5 cm to about 2 cm, about 2 cm to about 2.5 cm, about 2.5 cm to about 3 cm, about 3 cm to about 3.5 cm, about 3.5 cm to about 4 cm, about 4 cm to about 4.5 cm, about 4.5 cm to about 5 cm, about 5 cm to about 5.5 cm, about 5.5 cm to about 6 cm, and/or greater than 6 cm, and any width increment therebetween. First plate 100 has a height of between about 0.5 cm and about 4 cm including about 0.5 cm to about 1 cm, about 1 cm to about 1.5 cm, about 1.5 cm to about 2 cm, about 2 cm to about 2.5 cm, about 2.5 cm to about 3 cm, about 3 cm to about 3.5 cm, about 3.5 cm to about 4 cm. First plate 100 can be constructed from any suitable material as understood in the art including for example, treated or untreated, glass, polycarbonate, polystyrene, acrylic, Teflon™ and the like.

The second plate 200 in various embodiments has four or more edges including a top edge, a bottom edge, and two side edges. Second plate 200 has outer dimensions substantially similar to those of first plate 100 so that when assembled, the outer edges of first plate 100 are substantially aligned with the outer edges of second plate 200. Second plate 200 can have one or more openings 210 positioned such that when assembled, opening 110 of first plate 100 is substantially aligned with opening 210 of second plate 200.

Figure 2:
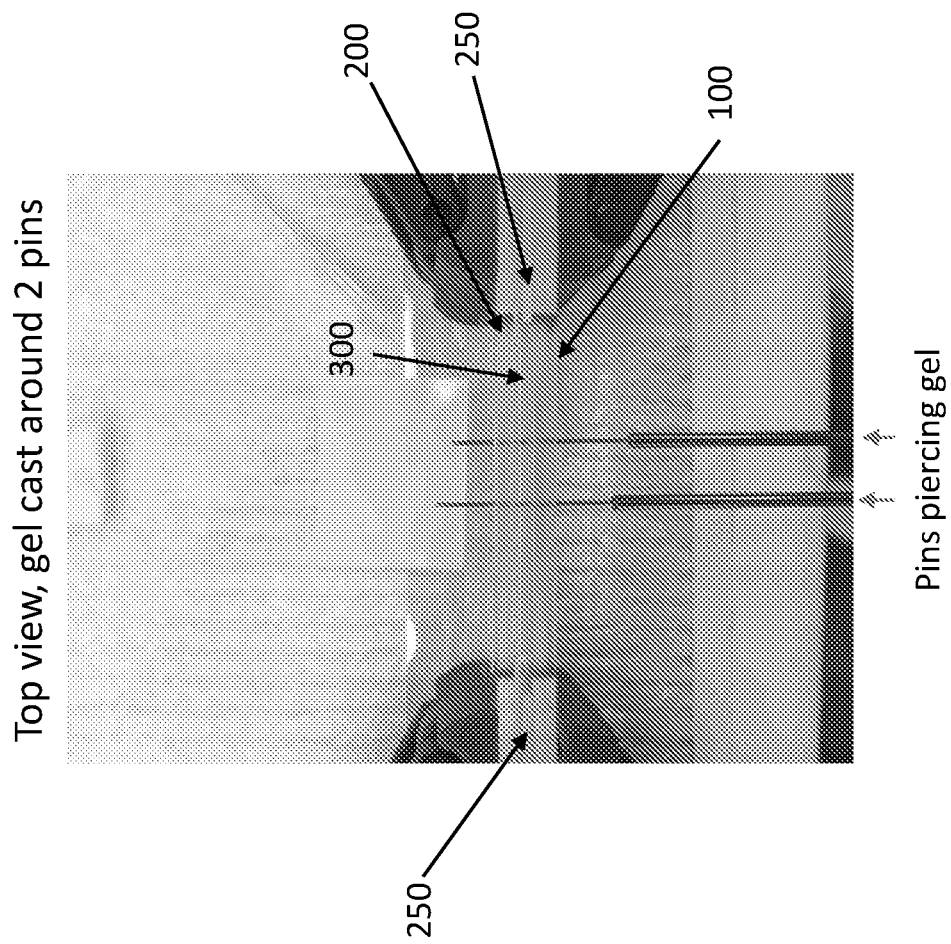
FIG. 2 depicts a top view of an exemplary intragel well sample loading system of the present invention.

Referring now to FIG. 2, in some embodiments, second plate 200 can include two or more spacers 250, positioned between first plate 100 and second plate 200 forming an interior gap between the two plates where gel 300 can be formed. Spacers 250 can have a length equivalent to the length of the side edges of first plate 100 and second plate 200. Spaces 250 can each have a width. Spacers 250 extend the height of second plate 200 and each have a width extending from the outer edge of second plate 200. The width of each of spacers 250 can be up to about 0.1 cm, about 0.1 cm to about 0.5 cm, about 0.5 cm to about 1 cm, about 1 cm to about 1.5 cm and the like. Spacers 250 can have a thickness of up to about 1 mm, about 1 mm to about 2 mm, about 2 mm to about 3 mm, about 3 mm to about 4 mm, about 4 mm to about 5 mm, about 5 mm to about 6 mm, about 6 mm to about 7 mm, about 7 mm to about 8 mm, about 8 mm to about 9 mm, about 9 mm to about 10 mm, and increments therebetween. The thickness of spacers 250 can be used to determine the thickness of gel 300 and thus can be selected based on the desired thickness of gel 300. In some embodiments, spacers 250 are attached to second plate 200 by any suitable means in the art including for example adhesive, epoxy, bonding, fusing, welding, and the like. In some embodiments, spacers 250 are not fused to second plate 200 but instead are removable and/or interchangeable. In some embodiments, first plate 100, second plate 200 and spacers 250 are constructed from a single pre-formed material. In some embodiments, first plate 100, second plate 200 and spacers 250 are assembled using suitable securing means as understood in the art including for example two or more brackets, clamps, frames and the like.

In some embodiments, the assembled microgel assembly 10 is used to form gel 300. In some embodiments, microgel assembly includes formed gel 300. Gel 300 includes any suitable gel as understood in the art including, for example, polyacrylamide gel, agarose gel, and the like. Gel 300 can include a polyacrylamide gel having between about 3% acrylamide and about 20% acrylamide by weight. For example, in various embodiments the polyacrylamide gel includes 5% acrylamide, 10% acrylamide, 12.5% acrylamide, 15% acrylamide, 20% acrylamide or increments thereof by weight. Gel 300 can include a gradient gel. The gradient can include 3% to 8%, 4% to 12%, 4% to 15%, 8% to 25%, and the like acrylamide, by weight.

Figure 3:
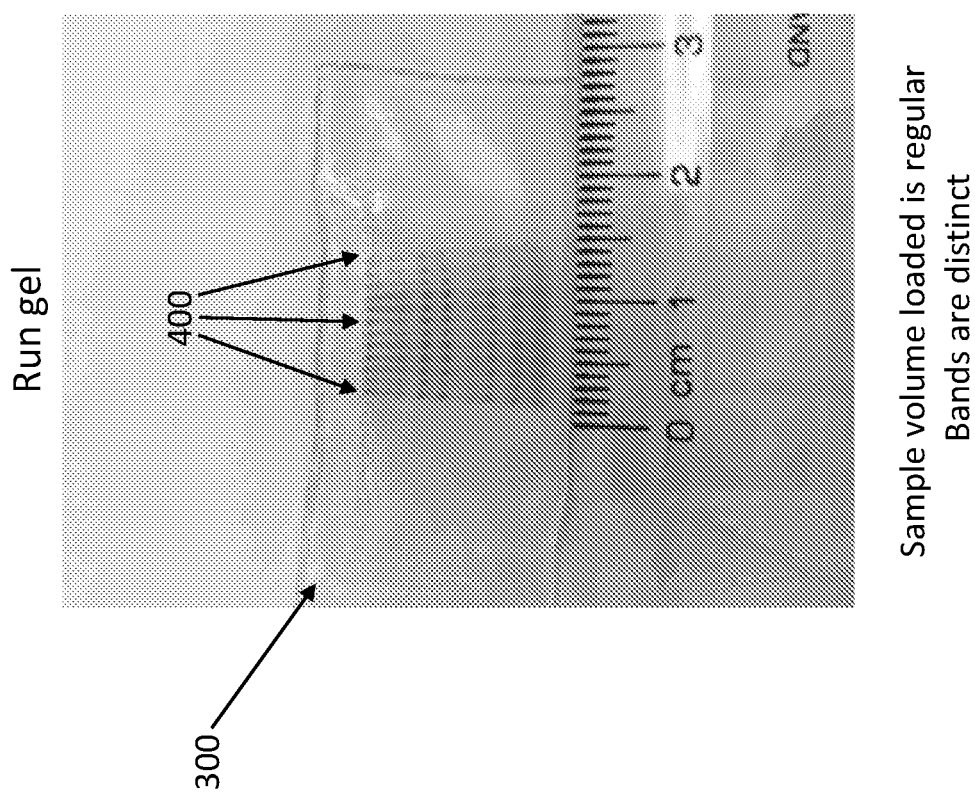
FIG. 3 depicts an exemplary gel that has been run using an exemplary electrophoresis system of the present invention. The gel as shown has been removed from between the first plate and second plate.

Gel 300 includes a plurality of wells 400, shown in FIGS. 1 and 3, that are positioned collinearly in gel 300 a non-zero distance from the top edge of the gel. In certain embodiments, wells 400 are positioned collinearly within gel 300. The wells may be positioned in a single line, in one or more aligned parallel lines, in one or more staggered parallel lines that are, in a zig-zag patterned line, in a suitable nonlinear pattern, or in some other suitable pattern as understood in the art. The plurality of wells 400 can extend completely or partially through gel 300. The wells 400 can extend through gel 300 at an angle to the plane of the gel that includes about 90 degrees. The angle can include a nonzero angle that is less than 90 degrees, or an angle that is greater than 90 degrees and less than 180 degrees.

Wells 400 can be a plurality of wells wherein the plurality of wells includes at least 1 well, 1 well to about 5 wells, about 5 wells to about 10 wells, about 10 wells to about 15 wells, about 15 wells to about 20 wells, about 20 wells to about 25 wells, about 25 wells to about 30 wells, about 30 wells to about 35 wells, about 35 wells to about 40 wells, about 40 wells to about 50 wells, about 50 wells to about 75 wells, about 75 wells to about 100 wells, and increments therebetween. Wells 400 can hold a volume of up to about 0.01 µL, about 0.01 µL to about 0.05 µL, about 0.05 µL to about 0.1 µL, about 0.1 µL to about 0.5 µL, about 0.5 µL to about 1 µL, about 1 µL to about 2 µL, about 2 µL to about 3 µL, about 3 µL to about 4 µL, about 4 µL to about 5 µL, about 5 µL to about 6 µL, about 6 µL to about 7 µL, about 7 µL to about 8 µL, about 8 µL to about 9 µL, about 9 µL to about 10 µL, about 10 µL to about 12 µL, about 12 µL to about 14 µL, about 14 µL to about 16 µL, about 16 µL to about 18 µL, about 18 µL to about 20 µL, and including all increments therebetween. Wells 400 can be formed by any suitable well-forming apparatus including, for example, one or more well-forming combs having a plurality of teeth, one or more rods and/or tubes including, for example, capillary tubes spaced within the opening of first plate 100 and second plate 200. Wells 400 can be positioned in a line having a distance from the top edge of gel 300 that includes up to about 1 mm, about 1 mm to about 2 mm, about 2 mm to about 3 mm about 3 mm to about 4 mm, about 4 mm to about 5 mm, about 5 mm to about 6 mm, about 6 mm to about 7 mm, about 7 mm to about 8 mm, about 8 mm to about 9 mm, about 9 mm to about 10 mm, and increments therebetween. Wells 400 can be positioned in a line having a distance from the bottom edge of gel 300 that includes up to about 10 mm, about 10 mm to about 15 mm, about 15 mm to about 20 mm, about 20 mm to about 25 mm, about 25 mm to about 30 mm, about 30 mm to about 35 mm, and increments therebetween. In some embodiments, the line of wells can be positioned such that the ratio of distance from the top edge to the distance from the bottom edge is about 1:2, about 1:2.5, about 1:3, about 1:3.5, about 1:4, about 1:4.5, about 1:5, about 1:5.5, about 1:6, and increments therebetween. In some embodiments, wells 400 are formed by placing one or more well-forming apparatus in opening 110/210 and then pouring, casting, polymerizing, and forming gel 300 around said apparatus to form wells 400. In some embodiments, wells 400 are formed by using one or more well-forming apparatus to remove or cut out a portion of formed gel 300 within opening 110/210. Embodiments of gel 300 can include a gel including only running gel and not including a stacking gel, as understood in the art. For example, gel 300 can include gel formed from a single concentration of polyacrylamide without a stacking gel, and/or formed from a continuous polyacrylamide concentration gradient without a stacking gel. Embodiments of wells 400 can be positioned in a portion of gel 300 that includes running gel and not stacking gel, as understood in the art. For example, as shown in FIG. 5, gel 300 may be loaded mid-gel. Mid-gel sample loading via intra-gel wells may be accomplished by electrokinetic loading or by through-holes penetrating the gel (annular penetration loading). In both cases, sample is introduced mid-gel, never coming into contact with buffer solution at the anodic or cathodic gel ends.

Figure 5A:
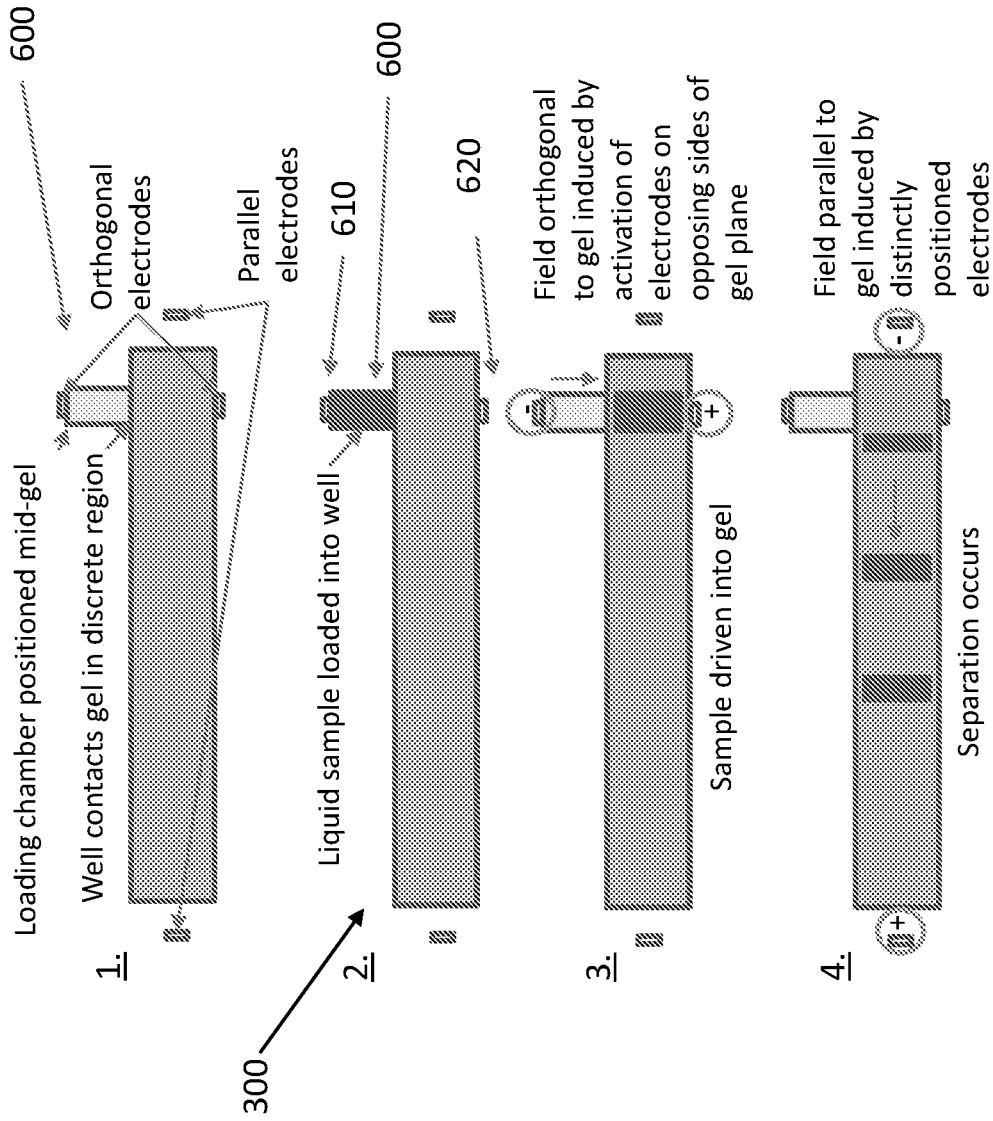
FIGS. 5A and 5B depict a side view of exemplary mid-gel sample loading into gels loaded either by electrokinetic loading (FIG. 5A) or annular penetrating loading (FIG. 5B). Mid-gel loading allows the sample to be introduced without coming into contact with the buffer solution at the anodic or cathodic gel ends.
Figure 5B:
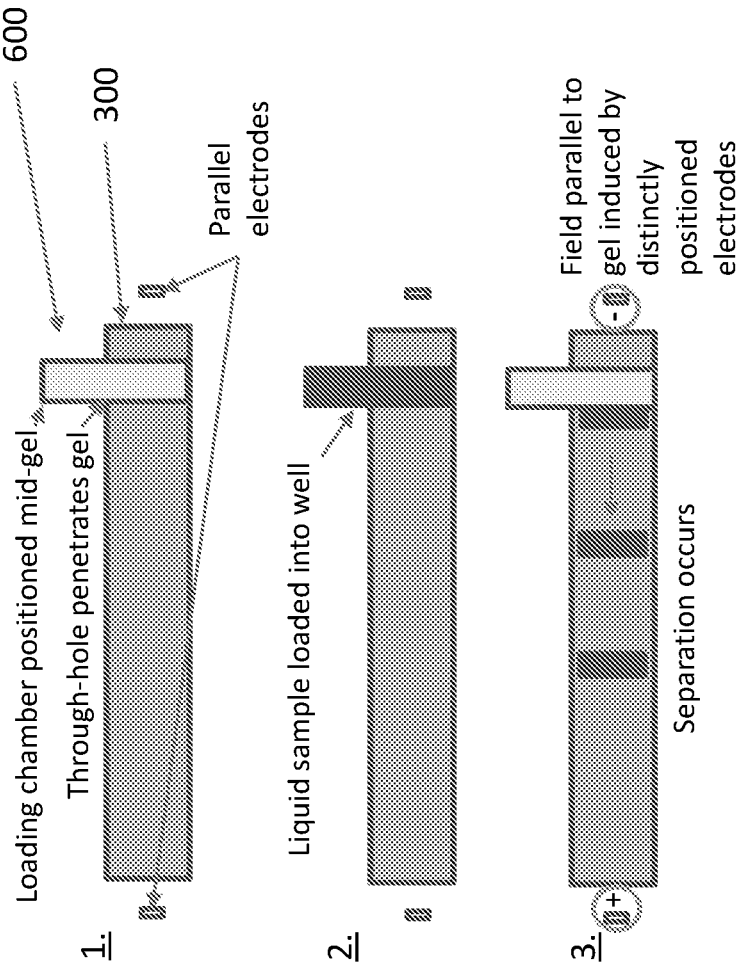

Referring now to FIGS. 5A and 5B, embodiments of the separation microgel assembly 10 include one or more loading chambers 600.

Referring now to FIG. 5A, embodiments of the one or more loading chambers 600 may be positioned on top of gel 300 and may be positioned in contact with a discrete region of the separating gel 300 adjacent to the desired position for the sample within the gel. The loading chambers 600 may include a first negative loading 610 electrode and a second positive loading electrode 620. The first and second electrodes may be positioned so that the first negative electrode 610 is positioned on the top of the loading chamber 600 above gel 300 and the second positive electrode 620 is positioned below gel 300. In some embodiments, first electrode 610 is positioned collinearly with second electrode 620. In some embodiments, first electrode 610 is non-collinear, but in all embodiments, first electrode 610 establishes voltage across the plane of the gel. The line formed between first electrode 610 and second electrode 620 is orthogonal to the plane of gel 300 so that when the electrodes are connected to a power supply, the protein sample electrophoretically migrates into the plane of gel 300. The loading chamber 600 includes a plurality of hollow cylinders or rectilinear hollow shafts in contact with the gel plane, the central axes of which are positioned orthogonal to the gel plane. The hollow cylinders or shafts form conduits which, once filled with a sample, contain the sample in position for loading. For example, the sample may be loaded using electrophoretic intra-gel loading, gravity-driven loading, positive or negative pressure-driven loading, convection-driven loading, sonophoresis-driven loading, and the like.

Referring now to FIG. 5B, embodiments of the one or more loading chambers 600 may be positioned on top of gel 300 and may include one or more through-holes that penetrate into gel 300 so that a loaded sample migrates via gravity into the plane of the gel 300.

Methods

Methods for Separating Proteins

Embodiments of the present invention provide methods 500 for separating proteins. The methods as provided herein include separating small volumes of proteins including sample volumes of less than about 10 µL.

Figure 4:
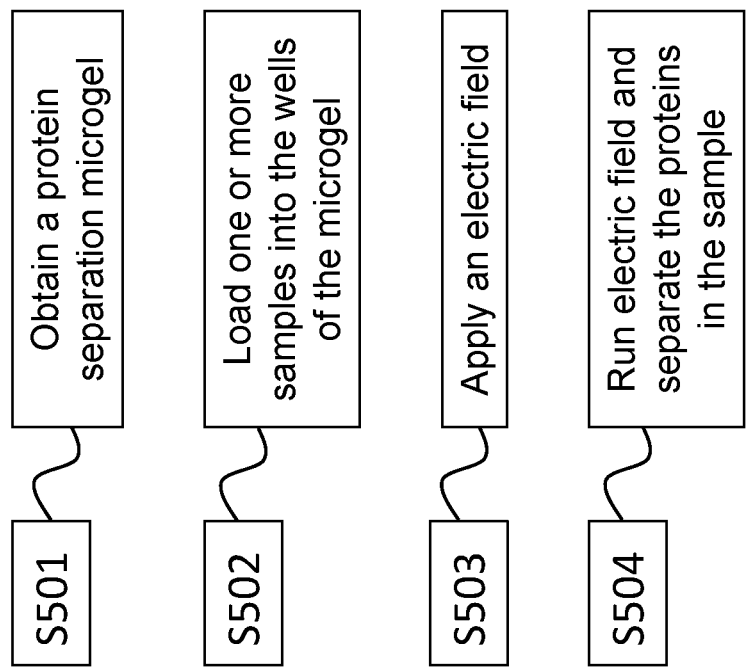
FIG. 4 depicts an exemplary method of the present invention.

Referring now to FIG. 4, embodiments of step S501 of method 500 includes obtaining a protein separation microgel having a plurality of wells as described herein. The microgel can include a polyacrylamide gel, an agarose gel, or other suitable gel as understood in the art. In other embodiments, the microgel separation matrix is constructed from a separation matrix other than gel including, for example, porous silica, one or more cellulose-based separation matrices (e.g., Cellufine™ chromatography media), one or more dextran-based matrices (e.g., Sephadex™ cross-linked dextran gel, Sephacryl™ cross-linked dextran matrix), one or more agarose-based matrices (e.g., Sepharose™ cross-linked agarose matrix, Bio-Gel® A agarose exclusion matrix), one or more polyacrylamide-based matrices (e.g., BioGel® P porous polyacrylamide matrix), one or more polystyrene-based matrices (e.g., Dowex-50™ ion exchange resin), and/or combinations thereof.

Embodiments of step S502 of method 500 includes loading the wells of the gel with a volume of one or more samples. The samples can include samples having one or more proteins. The sample volumes can include up to about 0.01 µL, about 0.01 µL to about 0.05 µL, about 0.05 µL to about 0.1 µL, about 0.1 µL to about 0.5 µL, about 0.5 µL to about 1 µL, about 1 µL to about 2 µL, about 2 µL to about 3 µL, about 3 µL, to about 4 µL, about 4 µL, to about 5 µL, about 5 µL to about 6 µL, about 6 µL to about 7 µL, about 7 µL to about 8 µL, about 8 µL to about 9 µL, about 9 µL to about 10 µL, about 10 µL, to about 20 µL, and increments therebetween. In various embodiments, the sample volumes can include up to about 40 µL, about 50 µL, about 60 µL, about 70 µL, about 80 µL, about 90 µL, about 100 µL, about 110 µL, about 120 µL, about 130 µL, about 140 µL, about 150 µL, about 160 µL, about 170 µL, about 180 µL, about 190 µL about 200 µL and increments therebetween.

Embodiments of step S503 of method 500 include applying an electric field to the loaded gel. The electric field is applied using any suitable means as understood in the art including for example an electrophoresis power supply. The electric field can have a voltage between about 5 V and about 150 V including about 25 V and about 125 V, about 30 V and about 100 V, about 40 V and about 80 V Embodiments of step S504 include running the electric field until a running front of the one or more samples reaches a preferred distance from the wells. The electric field can be run until the proteins in the sample are separated along the length of the gel. The gel can be run for a preferred or user-specified amount of time including up to about 5 minutes, about 5 minutes to about 15 minutes, about 15 minutes to about 30 minutes, about 30 minutes to about 45 minutes, about 45 minutes to about 60 minutes, about 60 minutes to about 75 minutes, about 75 minutes to about 90 minutes, and/or increments therebetween.

Methods for Loading Samples

Embodiments of the present invention include methods for loading protein samples into separation microgels 10, as described herein. Embodiments of the methods for loading samples include methods for electrokinetic loading. Embodiments of the methods for loading samples may include methods for annular penetration loading.

Referring now to FIG. 5A, methods for electrokinetically loading a sample into the gel 300 may include first positioning a loading chamber 600 mid-gel. That is, the loading chamber 600 is positioned adjacent to gel 300 in a desired position for loading the sample into the running gel portion of gel 300. For example, loading chamber 600 is positioned so that the central axis of the loading chambers are orthogonal to the plane of gel 300, and a desired distance from one or more edges of gel 300. One or more samples can be loaded into the loading chamber 600 before or after the chamber is positioned adjacent to gel 300. The samples may include any preferred protein sample as understood in the art. The sample may be prepared in one or more buffers suitable for gel electrophoresis. For example, protein-containing samples may be solubilized in one or more aqueous solutions. The aqueous solution may include a solution having a final concentration of 0.25 molar Tris-HCl, pH 6.8, 2.2% Sodium dodecyl sulfate, 300 millimolar mercaptoethanol, 5 mg/ml bromophenol blue. The first negative loading 610 electrode and the second positive loading electrode 620 can be positioned so that negative electrode 610 is on the top side gel 300 and positive electrode 620 is positioned on the bottom side of gel 300, collinear with negative electrode 610. Once the sample is loaded into the loading chamber 600, the electrodes are connected to a power supply and an electric field is applied between the first and second electrodes so that the sample is electrophoretically pulled into the gel. Once the gel is sufficiently loaded into the gel, the loading chamber electrodes 610 and 620 are disconnected from the power supply and the electrophoresis electrodes of the electrophoresis chamber are applied in order to separate the sample within the separating gel 300.

Referring now to FIG. 5B, methods for loading a sample into the gel 300 using annular penetration loading may include first positioning a loading chamber 600 into a desired position above gel 300. In some embodiments, the loading chamber includes a hole-penetrating member that penetrates and forms a through-hole in the gel for sample loading. In other embodiments, the loading chamber aligns with a pre-formed through-hole in gel 300. The loading chamber is positioned so that it is aligned with the through-hole in the gel 300. The sample is loaded into the loading chamber 600. The sample then migrates into the through hole in the gel by gravity-driven flow into the gel. Alternatively, the sample migrates into the hole in the gel by one or more active mechanisms including, for example, applied positive or negative pressure. Once the sample has sufficiently migrated into the gel, the electrodes of the electrophoresis chamber are connected to a power supply and the sample is electrophoretically separated within the separating gel 300.

Electrophoresis System

Embodiments of the invention provide one or more electrophoresis systems including at least one gel assembly 10 of the present invention, an electrophoresis device having one or more microgel-holding cassettes having one or more positive electrodes and one or more negative electrodes, a box having one or more sets of slots for positioning the plurality of cassettes, a volume of a running buffer, and a power supply configured to engage with the one or more positive electrodes and one or more negative electrodes. The microgel-holding cassettes include any suitable cassettes as understood in the art suitable for holding the one or more microgel assemblies 10 as described herein. The running buffer includes any suitable electrophoresis running buffer as understood in the art for use in electrophoresis systems for separating proteins by molecule weight. For example, in certain embodiments the running buffer contains one or more of Tris base, glycine, sodium dodecyl sulfate, water, and has a suitable pH including for example a pH of 8 to about 8.5, about 7.5 to about 9, and increments therebetween. The power supply can be switched into an operating mode when it is engaged with the electrodes so that a suitable electric field is then applied to the loaded gel, and the loaded sample(s) can be separated electrophoretically. The electric field has an electric potential of up to about 5 V, about 5 V to about 25 V, about 25 V to about 50 V, about 50 V to about 75 V, about 75 V to about 100 V, about 100 V to about 125 V, about 125 V to about 150 V, about 150 V to about 200 V, and increments therebetween. In general, the power supply is run at a constant current. The current may include up to about 5 mA, from about 5 mA to about 10 mA, from about 10 mA to about 15 mA, from about 15 mA to about 20 mA, from about 20 mA to about 25 mA, from about 25 mA to about 30 mA, from about 30 mA to about 35 mA, from about 35 mA to about 40 mA, from about 40 mA to about 45 mA, from about 45 mA to about 50 mA, and so on.

In another aspect, the invention provides a protein separation system comprising: a gel region adapted and configured to receive a gel having a depth less than its length; a pair of parallel electrodes positioned on opposing sides of the length of the gel received in the gel region; a pair of orthogonal electrodes positioned on opposing sides of the depth of the gel received in the gel region; and a sample reservoir adapted and configured for positioning proximal to the gel received in the gel region such that a first electric field flows from a negative orthogonal electrode, through the sample reservoir, and through the gel received in the gel region to the positive orthogonal electrode. In various embodiments, the protein separation system further comprises a controller (e.g., one or more switches, processors, and the like) adapted and configured to: apply the first electric field across the pair of orthogonal electrodes to load a sample in the sample reservoir onto the gel received in the gel region; then apply a second electric field across the pair of parallel electrodes to separate proteins within the gel received in the gel region. The gel received in the gel region refers to the gel placed in the system and positioned such that separation of the components of the sample by electrophoresis takes place when sample from the sample reservoir is loaded into the gel by activation of the first electrical field followed by activation of the second electrical field.

In various embodiments, the controller may be a series of switches configured to allow a user to independently activate and deactivate the orthogonal electrodes and the parallel electrodes in order to achieve sample loading and subsequent separation by gel electrophoresis.

In various embodiments, the protein separation system further comprises a first switch configured to apply the first electric field across the pair of orthogonal electrodes to load a sample in the sample reservoir onto the gel received in the gel region; then a second switch configured to apply a second electric field across the pair of parallel electrodes to separate proteins within the gel received in the gel region.

In various embodiments, the controller may be a computer comprising non-transitory computer readable media comprising instructions to operate the system according to the disclosure herein. In various embodiments, the system is configured to apply the first electric field and the second electric field serially.

In various embodiments the pair of orthogonal electrodes are positioned proximal to a negative parallel electrode. While the sample may in various embodiments be loaded into the gel at any non-zero distance from the edge, components of the sample achieve greater separation as they move further through the gel, therefore in various embodiments the sample is loaded such that the distance between the negative electrode and the sample is less than the distance to the positive electrode.

In various embodiments, the sample reservoir is an electrically insulative vessel. In various embodiments, the sample reservoir comprises plastic or glass.

EXPERIMENTAL EXAMPLES

The invention is further described in detail by reference to the following experimental examples. These examples are provided for purposes of illustration only, and are not intended to be limiting unless otherwise specified. Thus, the invention should in no way be construed as being limited to the following examples, but rather, should be construed to encompass any and all variations which become evident as a result of the teaching provided herein.

Example 1: Electrokinetic Intra-Gel Loading

Materials

A gel casting frame is used to prepare a gel for electrophoretic separating of a protein sample. The casting frame is comprised of two opposed 1 mm-thick acrylic panes. The panes have a square cross-section with a length and width dimension of 2 cm each. The panes are separated by a 1 mm gap that is sealed at either side of the panes and open at the top and bottom. Holes are positioned 5 mm from the top of the frame (15 mm from bottom) that have a diameter of about 250 μm. The holes and pass through both panes and are aligned. Glass rods having an outer diameter of 250 μm are used to insert into the holes.

The assembly also includes buffer chambers affixed to the top and bottom of the frame in order to hold buffer in contact with the gap between the panes. In addition, buffer chambers are affixed to either planar side of frame and are used to hold buffer in contact with the 250 μm holes.

The gel is formed using the following ingredients: polyacrylamide gel mix (AmericanBio AB00147), ammonium persulfate, Bis-Tris buffer (1M, pH 6.7), MOPS buffer (50 mM MOPS, 50 mM Tris, 1 mM EDTA, 0.1% SDS), and water.

Protein molecular weight standards are prepared in 30% glycerol and are loaded into the gel as well.

The gel assembly includes an electrophoresis power supply, cables, platinum wires.

Methods

Cast Gel in Frame:

The appropriate volumes of each of the following are mixed together: polyacrylamide gel mix, water, bis-tris buffer to make solution of desired percentage arylamide (anywhere from 4%-20%).

Next, the frame is prepared with tape across gap at bottom to seal. Glass rods are inserted into all holes on either side of panes, extending only as far as the acrylic but not into the gap between acrylic panes, to obstruct holes from filling with liquid acrylamide upon casting gel.

Ammonium persulfate is added to initiate polymerization. The gap can then be filled from top to bottom with acrylamide solution. The gel can then be allowed time to polymerize. Once the gel has sufficiently polymerized or set up, the tape and rods can be removed.

Prepare Apparatus for Electrophoresis:

The casting frame containing the gel with pane is positioned in horizontal orientation, with all 4 buffer chambers attached. All four buffer chambers are filled with MOPS buffer. With a 1 µl pipette tip, the molecular weight sample can then be administered to tops of the holes in the upper buffer chamber which is affixed to top plane of the frame. The samples can then sink into holes.

Discrete negative electrode wires leading from the power supply are positioned into the buffer chamber with samples. Negative electrode wires are also positioned into the buffer chamber in contact with gap closest to the sample holes.

Discrete positive electrode wires are positioned into the buffer chamber opposing the buffer chamber containing the samples. Positive electrode wires are also positioned into the buffer chamber at the opposite end of the gap from the other gap-contacting chamber.

Perform Electrophoresis:

The power supply is used to initiate the application of 30 V across the planes of the frame. The voltage is applied for 10 seconds, driving proteins present in the 1 mm-long by 250 µm-wide holes into the gel. Immediately upon cessation of gel loading, the voltage is adjust to 50 V which is then applied down the length of the gel filling the gap, and inducing migration and separation of the sample on the basis of molecular weight. The application of voltage is ceased once the proteins have migrated sufficiently. The position of the proteins is determined by the position of an indicator dye marking the migration front. The gel is then removed from frame and is processed as desired.

Results

Proteins are driven into gel via intra-gel wells electrokinetically in a step orthogonal to separation current, buffers and electrodes. Protein separation is conducted as a second, orthogonal electrophoretic process.

EQUIVALENTS

Although preferred embodiments of the invention have been described using specific terms, such description is for illustrative purposes only, and it is to be understood that changes and variations may be made without departing from the spirit or scope of the following claims.

INCORPORATION BY REFERENCE

The entire contents of all patents, published patent applications, and other references cited herein are hereby expressly incorporated herein in their entireties by reference.

What is claimed is:

1. A protein separation microgel comprising:
   a first plate having a first opening;
   a second plate having a second opening aligned with the first opening;
   a gel substrate formed between the first plate and the second plate; and
   a plurality of wells positioned at a first non-zero distance from a first edge of the gel substrate and at a second non-zero distance from a second edge of the gel substrate;
   wherein the first edge and second edge of the gel substrate are opposite edges of the gel substrate, and
   wherein the plurality of wells are formed by a well-forming insert comprising a plurality of teeth completely extending through the gel substrate within the first opening and the second opening.

2. The protein separation microgel of claim 1, wherein the plurality of wells are positioned collinearly.

3. The protein separation microgel of claim 1, wherein the gel substrate comprises polyacrylamide.

4. The protein separation microgel of claim 3, wherein the polyacrylamide comprises about 3% to about 20% acrylamide by weight.

5. The protein separation microgel of claim 3, wherein the polyacrylamide comprises 5% acrylamide, 10% acrylamide, 12.5% acrylamide, 15% acrylamide, or 20% acrylamide by weight.

6. The protein separation microgel of claim 3, wherein the gel substrate is a gradient gel.

7. The protein separation microgel of claim 6, wherein the gradient gel comprises 3% to 8%, 4% to 15%, 4% to 20%, or 8% to 25% acrylamide by weight.

8. The protein separation microgel of claim 1, wherein the plurality of teeth extend through the gel substrate at an orthogonal angle to a horizontal plane of the gel substrate.

9. The protein separation microgel of claim 1, wherein each well of the plurality of wells has a volume of about 0.05 µL to about 20 µL.

10. The protein separation microgel of claim 1, wherein the microgel has a width of between about 1.5 cm and about 3.5 cm.

11. The protein separation microgel of claim 1, wherein the microgel has a height of between about 1.0 cm and about 3.0 cm.

12. The protein separation microgel of claim 1, wherein the microgel has a thickness of between about 0.1 mm and about 5 mm.

13. The protein separation microgel of claim 1, wherein the first distance and second distance are at least about 0.1 mm.

14. The protein separation microgel of claim 1, wherein the first distance is between about 0.1 mm and about 2 mm.

15. The protein separation microgel of claim 1, wherein a ratio between the first distance and the second distance is less than about 1:3.

16. A method for separating proteins comprising:
   obtaining the microgel of claim 1;
   loading the plurality of wells with a volume of one or more samples, the one or more samples comprising a plurality of proteins;
   applying an electric field to the loaded gel substrate; and
   running the electric field until a running front of the one or more samples reaches a preferred distance from the plurality of wells;
   thereby separating the plurality of proteins.

* * * * *